US009552524B2

United States Patent
Artan et al.

(10) Patent No.: US 9,552,524 B2
(45) Date of Patent: Jan. 24, 2017

(54) SYSTEM AND METHOD FOR DETECTING SEAT BELT VIOLATIONS FROM FRONT VIEW VEHICLE IMAGES

(71) Applicant: XEROX CORPORATION, Norwalk, CT (US)

(72) Inventors: Yusuf Artan, Ankara (TR); Orhan Bulan, Rochester, NY (US); Robert P. Loce, Webster, NY (US); Peter Paul, Webster, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/486,211

(22) Filed: Sep. 15, 2014

(65) Prior Publication Data

US 2016/0078306 A1   Mar. 17, 2016

(51) Int. Cl.
| | |
|---|---|
| G06K 9/00 | (2006.01) |
| G06K 9/62 | (2006.01) |
| G06K 9/46 | (2006.01) |
| B60N 2/00 | (2006.01) |
| B60R 22/48 | (2006.01) |

(52) U.S. Cl.
CPC .......... *G06K 9/00838* (2013.01); *B60N 2/002* (2013.01); *B60R 22/48* (2013.01); *G06K 9/6202* (2013.01); *G06K 9/6256* (2013.01); *G06K 9/6269* (2013.01); *B60R 2022/485* (2013.01); *B60R 2022/4816* (2013.01)

(58) Field of Classification Search
None
See application file for complete search history.

(56) References Cited

U.S. PATENT DOCUMENTS

| | | | | |
|---|---|---|---|---|
| 2006/0062451 | A1* | 3/2006 | Li | G06K 9/00228 382/159 |
| 2007/0195990 | A1* | 8/2007 | Levy | B60R 22/48 382/100 |
| 2010/0182425 | A1* | 7/2010 | Sakakida | B60N 2/002 348/135 |
| 2011/0293141 | A1* | 12/2011 | Robert | G06K 9/00785 382/103 |

(Continued)

FOREIGN PATENT DOCUMENTS

FI   WO 2012160251 A2 * 11/2012 ......... G06K 9/00845

OTHER PUBLICATIONS

Lim et al., "Development of a Safety Belt Violation Enforcement System Using License Plate Reading", Proceedings of the 7th World Congress on Intelligent Systems, Turin, Italy, 2000, pp. 1-6.*

*Primary Examiner* — Matthew Bella
*Assistant Examiner* — Jose M Torres
(74) *Attorney, Agent, or Firm* — MH2 Technology Law Group, LLP

(57) ABSTRACT

A system and method for detecting a seat belt violation in a vehicle. The method may include receiving an image including a region of interest where a seat belt is visible if the seat belt is buckled. One or more first features may be extracted from the image. The one or more first features may be compared to one or more second features extracted from a plurality of sample images. It may be determined whether the seat belt is buckled in the image based upon the comparison.

20 Claims, 4 Drawing Sheets

(56) References Cited

U.S. PATENT DOCUMENTS

| | | | |
|---|---|---|---|
| 2012/0069183 A1* | 3/2012 | Aoki | G07B 15/063 348/148 |
| 2013/0051625 A1* | 2/2013 | Fan | G06K 9/00234 382/104 |
| 2013/0147959 A1* | 6/2013 | Wang | G06K 9/00838 348/149 |
| 2013/0336538 A1* | 12/2013 | Skaff | G06K 9/00785 382/104 |
| 2015/0278617 A1* | 10/2015 | Oami | G06T 1/60 382/103 |

* cited by examiner

SYSTEM AND METHOD FOR DETECTING SEAT BELT VIOLATIONS FROM FRONT VIEW VEHICLE IMAGES

TECHNICAL FIELD

The present teachings relate generally to systems and methods for detecting seat belt violations and, more particularly, to systems and methods for detecting seat belt violations from front view vehicle images.

BACKGROUND

It is a traffic violation in most states when a passenger in the front seat of a moving vehicle does not have his or her seat belt fastened. As used herein, "passenger" refers to any person in the front seat of the vehicle, whether on the "driver's side" or the "passenger's side." In the majority of states (e.g., 33 states), seat belt violations are primary enforcement laws, meaning that an officer may stop and ticket a passenger for not wearing a seat belt, even when no other violations have occurred.

One current practice for enforcement involves police officers on the roadside visually examining passing vehicles to determine whether the front seat passenger has the seat belt fastened. Another practice involves a police officer or other operator examining video from a remote location to determine whether the front seat passenger has the seat belt fastened. Both of these practices, however, are expensive, difficult, and do not have a high detection rate. What is needed, therefore, is an improved system and method for detecting seat belt violations.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A method for detecting a seat belt violation in a vehicle is disclosed. The method may include receiving an image including a region of interest where a seat belt is visible if the seat belt is buckled. One or more first features may be extracted from the image. The one or more first features may be compared to one or more second features extracted from a plurality of sample images. It may be determined whether the seat belt is buckled in the image based upon the comparison.

In another embodiment, a plurality of first images may be received, each including a region of interest where a seat belt is visible if the seat belt is buckled. One or more first features may be extracted from each of the first images. A classifier may be trained to determine whether the seat belt is buckled using the one or more first extracted features. A second image may be received including the region of interest. One or more second features may be extracted from the second image. The one or more second extracted features may be compared to the one or more first extracted features. It may be determined whether the seat belt is buckled in the second image based upon the comparison.

A system for detecting a seat belt violation in a vehicle is also disclosed. The system may include a training device and a determination device. The training device may receive a plurality of first images, each including a region of interest where a seat belt is visible if the seat belt is buckled. The training device may extract one or more first features from each of the first images. The training device may then determine whether the seat belt is buckled using the one or more first extracted features. The determination device may be configured to receive a second image including the region of interest. The determination device may extract one or more second features from the second image. The determination device may then compare the one or more second extracted features to the one or more first extracted features and determine whether the seat belt is buckled in the second image based upon the comparison.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

Figure 1:
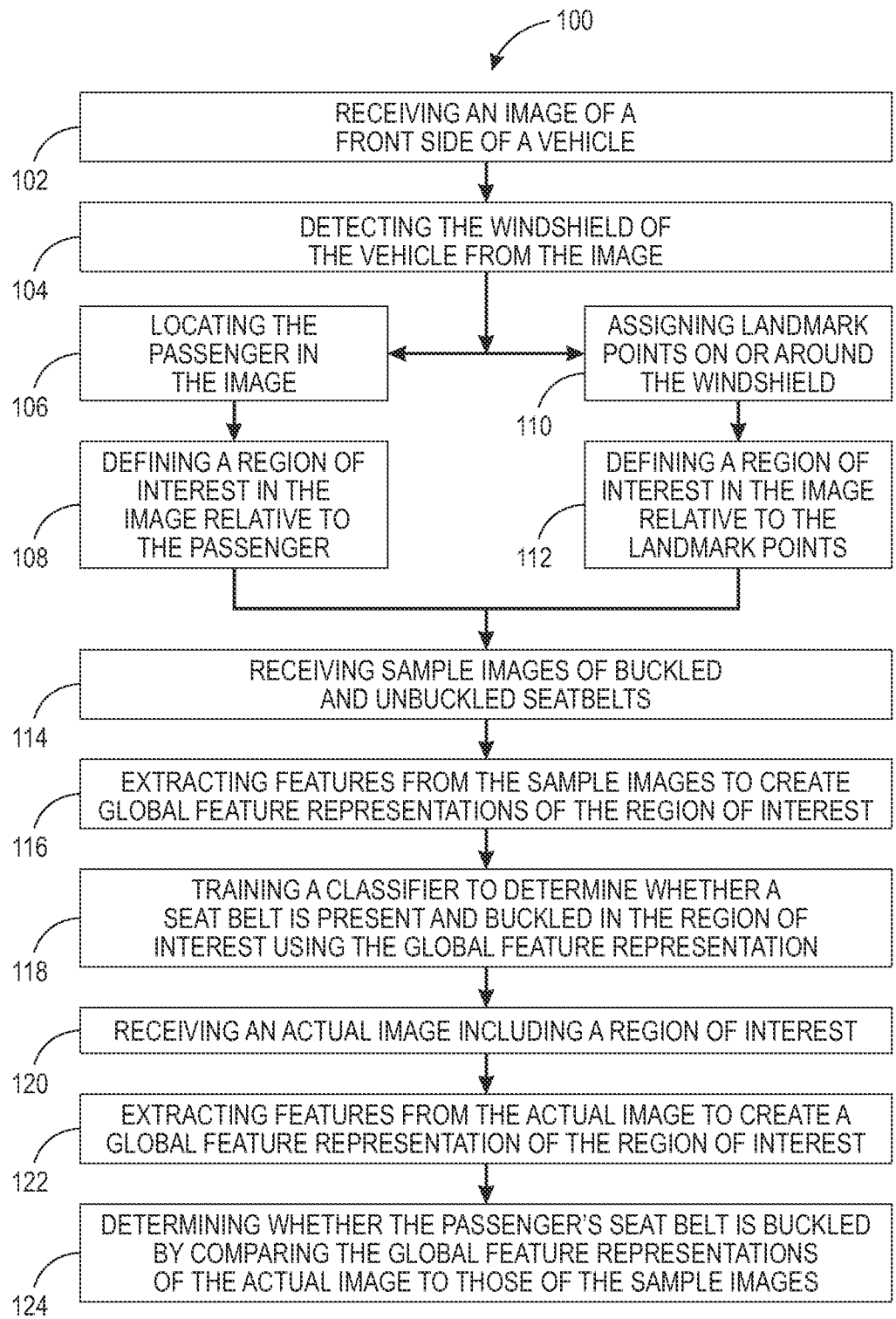
FIG. 1 depicts a flowchart of a method for detecting a seat belt violation in a vehicle, according to one or more embodiments disclosed.
Figure 2:
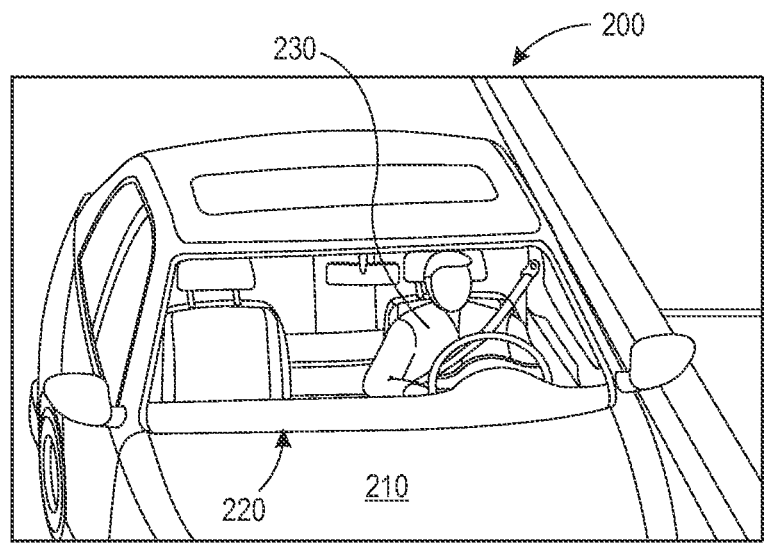
FIG. 2 depicts an illustrative front view image of a vehicle, according to one or more embodiments disclosed.

FIG. 1 depicts a flowchart 100 of a method for detecting a seat belt violation in a vehicle, according to one or more embodiments disclosed. The method may begin by capturing or receiving an image of a front side of a vehicle, as at 102. An illustrative image 200 of a front side of a vehicle 210 is shown in FIG. 2. The image 200 may include the windshield 220, through which one or more front-seat passengers 230 may be viewed. Although not shown in FIG. 2, the image 200 may also include the front license plate, which may be used to identify the vehicle 210.

In at least one embodiment, the image 200 may be captured with a red-green-blue ("RGB") camera that is directed toward the windshield 220 of the vehicle 210. If the image 200 is taken at night, an external illuminator may be used, which may be specialized for the imaging system, or may be part of the roadway lighting, such as a street light. Alternatively, the camera may have near infrared ("NIR") capabilities, and an infrared ("IR") external illuminator may be used at night. In another embodiment, the image 200 may be captured by a high occupancy vehicle/high occupancy tolling ("HOV/HOT") camera or a speed detection camera. The image 200 may be captured while the vehicle 210 is travelling along a local road or highway, or while the vehicle 210 is stopped at or passing through a traffic light.

Figure 3:
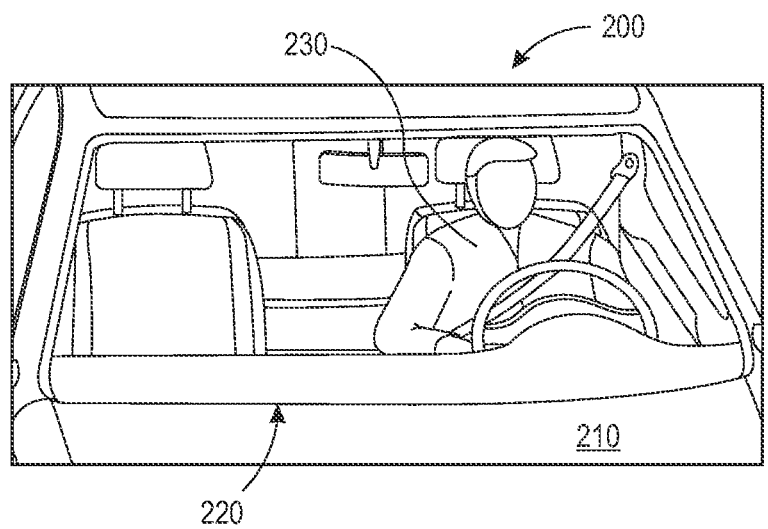
FIG. 3 depicts a portion of the front view image shown in FIG. 2 (e.g., the windshield), according to one or more embodiments disclosed.

FIG. 3 depicts a portion of the image 200 (e.g., the windshield 220), according to one or more embodiments disclosed. Referring to FIGS. 1 and 3, once the image 200 is captured, the windshield 220 of the vehicle 210 may be detected in the image 200, as at 104 in FIG. 1. The windshield 220 may then be cropped out, and the remainder of the image 200 may be removed or disregarded in subsequent processing, as shown in FIG. 3. Focusing on a localized region of interest (e.g., the windshield 220) may save in time and computational cost. In addition, the localized region of interest may allow a machine-learning based approach to focus on relevant differentiating characteristics between non-violators and violators (i.e., passengers having their seat belts buckled and passengers not having their seat belts buckled, respectively) and not extraneous features in the image 200.

Figure 4:
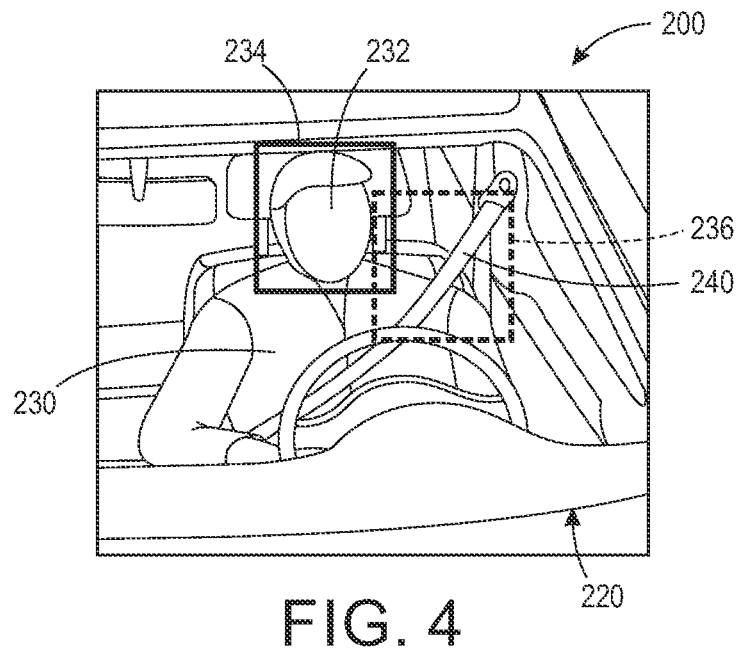
FIG. 4 depicts a portion of the windshield shown in FIG. 3 (e.g., the driver's side), according to one or more embodiments disclosed.

FIG. 4 depicts a portion of the windshield 220 (e.g., the "driver's side"), according to one or more embodiments disclosed. In at least one embodiment, the image of the windshield 220 (shown in FIG. 3) may be cropped again to focus on the side of the vehicle 210 having the passenger 230 (as shown in FIG. 4). As shown, the image of the windshield 220 has been cropped to focus on the "driver's side" of the vehicle 210, which includes the passenger 230, and the "passenger's side" of the vehicle 210, which is empty in this instance, has been removed. This may further reduce the size of the region of interest by eliminating additional extraneous features. As will be appreciated, in other embodiments, the image of the windshield 220 may be cropped to focus on the "passenger's side" of the vehicle 210 when a passenger 230 is present on this side of the vehicle 210.

The passenger 230 may then be detected or located in the image 200, as at 106 in FIG. 1. More particularly, the face 232 of the passenger 230 may be detected or located in the portion of the image 200 including the windshield 220 (as shown in FIG. 3) or the portion of the image 200 including a side (e.g., the driver's side) of the windshield 220 (as shown in FIG. 4). The passenger's face 232 is identified inside the area 234 in FIG. 4.

In at least one embodiment, the region of interest may be reduced even further than the windshield 220 (as shown in FIG. 3) or the portion of the image 200 including a side (e.g., the driver's side) of the windshield 220 (as shown in FIG. 4). For example, the region of interest may be defined as the area 236 relative to the location of the passenger 230, as at 108. As shown, the region of interest 236 may be proximate to and/or at least partially overlap the area 234 identifying the passenger's face 232. The region of interest 236 may include the chest and/or shoulder region of the passenger 230 where the seat belt 240 would be visible, if buckled. For example, the region of interest 236 may include the left chest and/or shoulder of a passenger 230 on the "driver's side," or the region of interest 236 may include the right chest and/or shoulder of a passenger 230 on the "passenger's side."

The geometrical relationship between the area 234 identifying the passenger's face 232 and the region of interest 236 may be defined through an a priori relationship or may be learned from training data. In at least one embodiment, the relationship may be described by the equations below:

$$r_{ROI}(i) = r_{BB}(i) + R(i) \quad (1)$$

$$c_{ROI}(i) = c_{BB}(i) + C(i) \quad (2)$$

$$i = 1, 2, 3, 4 \quad (3)$$

In Equations (1)-(3), r and c represent the row and column indices into the image 200 (or portion thereof), R and C represent the row and column offsets which may have a positive, negative, or zero value, BB represents the area 234 identifying the passenger's face 232, ROI represents the region of interest 236, and i represents the corners of a box. The terms R(i) and C(i) may be determined from a nominal windshield image or may be learned from training data.

Alternatively, the region of interest 236 may be determined using a certain geometric relationship relative to the windshield 220. The geometric relationship may be a fixed relationship based on a nominal windshield, or it may be determined from the training data.

Figure 5:
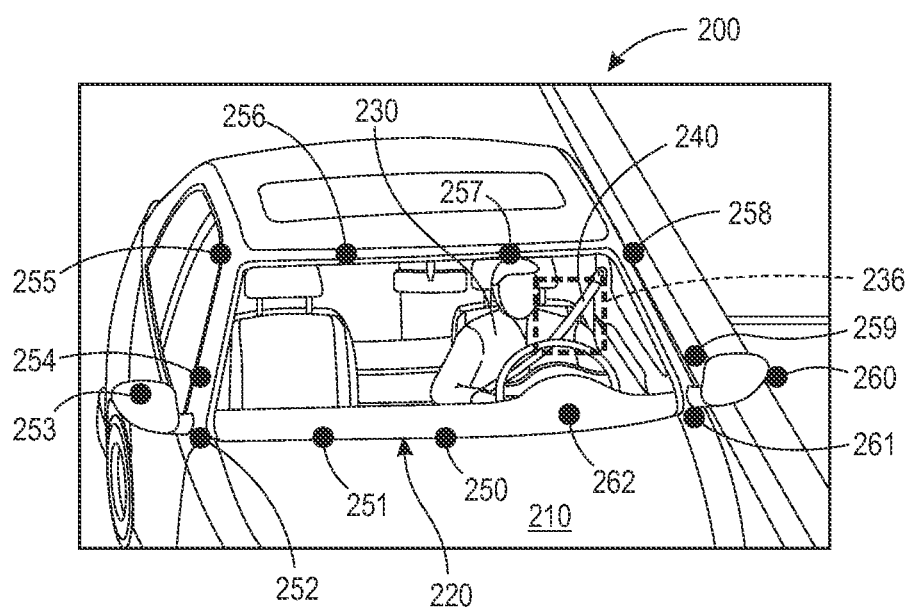
FIG. 5 depicts an illustrative front view image of a vehicle including a plurality of landmark points, according to one or more embodiments disclosed.

FIG. 5 depicts an illustrative front view image of the vehicle 200 including a plurality of landmark points 250-262, according to one or more embodiments disclosed. One or more landmark points 250-262 may be assigned or detected at set positions proximate to the windshield 220, as at 110. For example, point 250 may be at the bottom center of the windshield 220, and point 253 may be on the rear view mirror on the "passenger's side" of the vehicle 200. Although thirteen points 250-262 are shown, it will be appreciated that more or fewer points may be used. The following equations may at least partially define the region of interest 236 relative to the points 250-262.

$$r_{ROI}(i) = f_i(LM) \quad (4)$$

$$c_{ROI}(i) = g_i(LM) \quad (5)$$

$$i = 1, 2, 3, 4 \quad (6)$$

$$LM = \{LM_1, LM_2, \ldots, LM_{13}\} \quad (7)$$

$$LM_j = (r, c) \text{ for the } j\text{th landmark}, j = 1, 2, \ldots, 13 \quad (8)$$

In Equations (4)-(8), $f_i$ represents a function that outputs a linear combination of row indices of the landmark points, LM represents the landmark points, and $g_i$ represents a function that outputs a linear combination of column indices of the landmark points.

In at least one embodiment, points 257, 258, 261, 262 may define a bounding box that includes the region of interest 236. Then, the region of interest 236 may be defined relative to the points (e.g., points 257, 258, 261, 262), as at 112. For example, Equations (1)-(3) for the area 234 identifying the passenger's face 232 (replaced with the bounding box defined by points 257, 258, 261, 262 and new values for R(i) and C(i)) may be used to define the region of interest 236.

An image classification may be performed including a first or "offline" phase and a second or "online" phase. In at least one embodiment, the offline phase may occur prior to receiving the image 200 of the front side of the vehicle 210 (e.g., block 102 in FIG. 1). The offline phase may include receiving one or more sample images known to include a buckled seat belt 240 and one or more sample images known to include an unbuckled seat belt 240, as at 114. The sample images may be cropped to focus on the windshield 220 or the region of interest 236.

One or more features may be extracted from each of the sample images to create global feature representations of the region of interest 236, as at 116. Illustrative features may include Fisher Vectors, bag-of-words ("BoW"), histograms of oriented gradients ("HOGs"), Harris Corners, local binary patterns ("LBPs"), speeded-up robust features ("SURFs"), scale-invariant feature transforms ("SIFTs"), a combination thereof, or the like. As used herein, "global feature representations" refers to creating a single feature representation vector for the entire region of interest 236.

A classifier may then be trained to use the extracted features and/or the global feature representations (from the sample images) to classify or determine whether or not a seat belt 240 is present and buckled in the region of interest 236, as at 118. For example, the classifier may be trained to associate certain features with a buckled seat belt 240 and certain other features with an unbuckled seat belt 240. The classifier may be a support vector machine ("SVM"), a decision tree, a neural network, a combination thereof, or the like.

In the online phase, an actual image (e.g., the image 200 shown in FIGS. 2, 3, 4, and/or 5) including the region of interest 236 may be received by the classifier, as at 120. The classifier may then extract the same type of image features from the region of interest 236 in the actual (as opposed to sample) image to create a global feature representation, as at 122. The classifier may then determine whether the seat belt 240 is present and buckled by comparing the extracted features and/or the global feature representations from the actual image to those of the sample images, as at 124. Images of potential violators (i.e., passengers 230 that are determined to not have their seat belt 240 buckled) may be reviewed by a law enforcement officer or other operator, and appropriate action may be taken. Appropriate action may include stopping the vehicle 200, warning the passenger 230, and/or issuing a ticket to the passenger 230.

Figure 6:
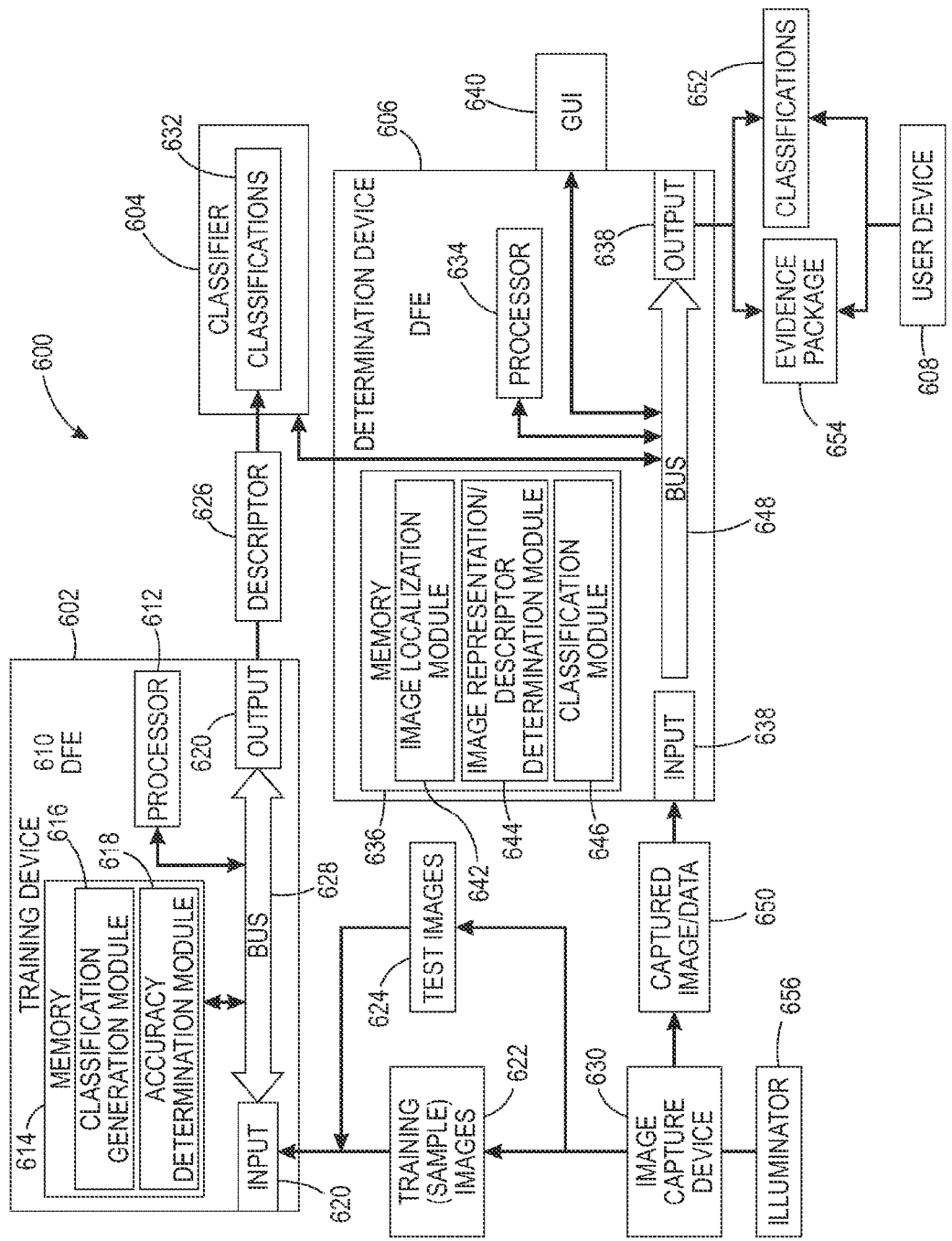
FIG. 6 depicts a schematic view of an illustrative system 600 configured to perform image analysis for detecting a seat belt violation in a vehicle, according to one or more embodiments disclosed.

FIG. 6 depicts a schematic view of an illustrative system 600 configured to perform image analysis for detecting a seat belt violation, according to one or more embodiments disclosed. The system 600 may include a training device 602, a storage device (also referred to as a classifier) 604, and a violation determination device 606, which may be linked together by communication links, referred to herein as a network. In one embodiment, the system 600 may be in further communication with a user device 608.

The training device 602 may include a controller 610 that is part of or associated with the training device 602. The controller 610 may be configured to control training of the seat violation detection system 600 by generating at least one descriptor that can be later compared to descriptors computed from captured images. The controller 610 may include a processor 612, which controls the overall operation of the training device 602 by execution of processing instructions, which are stored in a memory 614 connected to the processor 612.

The memory 614 may represent any type of tangible computer readable medium such as random access memory (RAM), read only memory (ROM), magnetic disk or tape, optical disk, flash memory, or holographic memory. In one embodiment, the memory 614 may include a combination of random access memory and read only memory. The digital processor 612 may include a single-core processor, a dual-core processor (or more generally by a multiple-core processor), a digital processor and cooperating math coprocessor, a digital controller, or the like. The digital processor 612, in addition to controlling the operation of the training device 602, executes instructions stored in the memory 614 for performing the parts of the method outlined herein that is performed at the system 600. In some embodiments, the processor 612 and memory 614 may be combined in a single chip.

The training device 602 may be embodied in a networked device, although it is also contemplated that the training device 602 may be located elsewhere on a network to which the system 600 is connected, such as on a server, networked computer, or the like, or distributed throughout the network or otherwise accessible thereto. The classifier may be a Support Vector Machine (SVM), which is trained on a set of labeled windshield images according to the instructions contained in the memory 614. In particular, the memory 614 stores a classification generation module 616, which is adapted to acquire training images with labels, group images with the same label in a set, calculate features using a set of labeled data, associate a set of features with a select classification, compute a signed distance between the vehicle image kernel transformed representations (i.e., feature vector/descriptor) in the projected feature space and a hyperplane boundary, compare the unsigned distance to a threshold, and classify the image based on results of the comparison. These instructions may be stored in one module. In other embodiments, a sparse network of winnow (SNoW) or a neural network may be used in place of or in addition to the SVM.

The software modules as used herein are intended to encompass any collection or set of instructions executable by the training device 602 or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server (not shown) or other location to perform certain functions.

The training device 602 may also include one or more communication interfaces, such as network interfaces, for communicating with external devices. The communication interfaces 620 may include, for example, a modem, a router, a cable, and and/or Ethernet port, etc. The communication interface 620 may be adapted to receive sample (hereinafter "training") images 622 and test images 624 as input and provide at least one descriptor and/or class association (assigned to a set of descriptors) 626 as output. One communication interface may receive the input and provide the output. The various components of the training device 602 may be all connected by a bus 628.

The training device 602 may include one or more special purpose or general purpose computing devices, such as a server computer or digital front end (DFE), or any other computing device capable of executing instructions for performing the exemplary method. The training device 102 may be connected to an image capture device 630 for inputting and/or receiving the training and test images 622, 624 in electronic format. The image capture device 630 may include a camera that is selected to provide the training and test images 622, 624, or it may be an input device adapted to transmit the images captured by a camera to the training device 602. For example, an input device may include a scanner, a computer, or the like. In another embodiment, the image data may be input from any suitable source, such as a workstation, a database, a memory storage device, such as a disk, or the like. The input device may be in communication with the controller 602 containing the processor 612 and memories 614.

The training device 602 may be in communication with a server (not shown) that includes a processing device and memory, such as the storage device 604, or has access to the storage device 604, for storing classes/classifications that may be used by the violation determination device 606. The storage device 604 may include a repository, which stores at least one class 632 (and/or its associated descriptor) provided by the training device 602.

The violation determination device 606 may be in communication with the storage device 604 and the image capture device 630. The determination device 606 may be adapted to acquire captured image data 650 from the image capture device 630 positioned to view a lane or other area of interest. In the present embodiment, the image capture device 630 may be the same camera used to capture training and test images, or it may be a different camera. Here, the camera-based imaging system is proposed to capture frontal-view images the vehicle.

The system 600 may also include at least one illuminator 656, which provides illumination that is not obtrusive to the driver but still enables robust capturing despite ambient light conditions. In one contemplated embodiment, a near infrared (NIR) illuminator 656 source may be used having a wavelength greater than about 750 nm. In another embodiment, a visible light illuminator may be stationed to provide illumination without shining into eyes of the driver.

The exemplary determination device 606 may include, for example, a computer or microcomputer. The determination device 606 may be included as part of the image capture device 630 or it may be in communication with the image capture device 630. The determination device 606 may include a processor 634, such as a CPU, and a memory 636 for storing software modules executable on the processor of the CPU and at least one communication interface 638 including hardware and/or software suitable for providing wireless data communication with the storage device 604, the image capture device 630, and a graphical user interface (GUI) 640. The memory 636, processor 634, and communication interface(s) 638 may be similarly configured to the memory 614, processor 612, and communication interface 620 of the training device 602. The exemplary software module may include an image localization module 642, which locates a windshield region (or desired side of the windshield region, or other region) of the vehicle in a captured image; an image representation determination module 644, which computes a descriptor of the windshield region for analyzing a cabin region of the vehicle using pixels of the image; and, a classification module 646, which classifies the captured image into a respective class. The various components of the violation determination device 606 may be all connected by a bus 648.

The module 644 may apply an automatic detection algorithm to the image to determine whether the vehicle is a candidate offender/violator. Generally, the module 644 computes an image representation(s). More specifically, the module 644 computes a descriptor for describing the cabin of the vehicle using pixels of the image. Several embodiments are contemplated for computing a descriptor. One embodiment uses a global approach, which extracts a single descriptor for describing the localized image. A global descriptor may be computed from pixel statistics. Another embodiment contemplates a sub-image approach, which extracts local descriptors from small patch regions in the image. A single signature may be aggregated from the patches for classification.

In a conventional object recognition approach, parts of the image are searched for objects that may be associated with specific items. The objects are labeled as including, for example, a face, a seat, a seat belt, a phone etc. The labels are then applied to a classifier for determining whether there is a seat belt violation.

However, in the global feature representation approach, the module 644 may define a set of generic features that describe the entire image and not just parts (associated with objects and the location of objects) of the image. More specifically, the module 644 may apply an algorithm that provides feature vectors describing the image data. In this manner, the computed feature vectors may be used to classify the image without requiring the use of labels of objects.

In one embodiment, the module 644 may be adapted to perform a successive mean quantization transform ("SMQT") approach. Generally, the SMQT process determines a feature vector for each pixel in the image by analyzing a vicinity of the pixel. More specifically, for each pixel that is analyzed, the pixel is designated as a center pixel in a vicinity/region. An average value (e.g., 0-255) for the region may be determined. This average is set as a threshold value. Then, the value of each pixel in the region (i.e., the center pixel and the surrounding pixels in the region) may be compared to the threshold. The pixels are each assigned a binary value based on the comparison. For example, pixels having a value below the threshold may be assigned a "0" value and pixels having a value meeting or exceeding the threshold may be assigned a "1" value. For example, a 9-bit binary number may be generated for a 3×3 vicinity of a pixel using the binary values of each pixel in the region. The binary number may be converted to a decimal number. This decimal number is a descriptor of the center pixel. The process then generates a feature vector using the decimal numbers for each of the pixels in the image.

In the sub-image descriptor approach, the module 644 first identifies patch regions in the image. The module 644 then extracts descriptors from the patch regions. The patch descriptors are then aggregated into image-level descriptors. Generally, the patch descriptors correspond to low-dimensional feature vectors and the image-level descriptor corresponds to a high-level feature vector.

In another embodiment using the global descriptor approach, the module 644 may be adapted to extract local patches and represent them with descriptors, following techniques understood in the art such as the SIFT.

In another embodiment using the global descriptor approach, the module 644 may be adapted to perform a histogram of gradients ("HOG") process following the technique understood in the art. Generally, the HOG approach compiles histograms for localized cells (i.e., spatially connected/overlapped cell blocks/block regions of pixels, e.g., 4×6 pixels) in an image. In one embodiment, the process may generate a histogram of gradient directions (e.g., orientations) for pixels in each cell, though other descriptors may be used such as shape, texture, and color, etc. In other words, gradients are determined for each cell, the number of occurrences of gradient orientations is counted, and a histogram is formed representing the count for each of the orientations. The combination of histograms (e.g., for all cells) may be used to form the descriptor. More specifically, the descriptor may be generated as feature vectors representing the normalized histograms for all block regions.

In one embodiment using the sub-image descriptor approach, the module 644 may be adapted to compute a Bag-of-Visual-Words ("BOW") representation using a technique that is understood in the art. This technique may include learning a set of patch prototypes by clustering the set of low-level descriptors such as HOG or SIFT. Given a new image, each of its patch descriptors may be assigned to its closest prototype, and the image is described by the histogram of the number of occurrences of each prototype.

In another embodiment, using the sub-image descriptor approach, the module 644 may be adapted to compute a Fisher Vector ("FV") representation. This technique may include learning a probabilistic model of the low-level descriptors using, for instance, a Gaussian Mixture Model ("GMM"). Given a new image, it is characterized by the gradient of the log-likelihood of the image descriptors on the GMM with respect to the model parameters.

In summary, the sub-image approach may extract multiple local descriptors from the windshield sub-image and then aggregate them into a sub-image-level global descriptor. Furthermore, because the system 600 is modular, it may use other features and types of kernels in the classifier for performing the above-mentioned algorithms. In yet another embodiment, a combination of the above approaches may be used. Computing the descriptor may also extend to multi-band systems, where the sets of features from images from different spectral bands may be combined. Regardless of the approach used, the module 644 may transmit the descriptor/feature vector to the classification module 646.

The captured image data 150 may undergo processing by the violation determination device 606, and a classification 652 and/or evidence package 654 may be displayed to the user in a suitable form on the GUI 640 in communication with the determination device 606. The GUI 640 may include a display, for displaying information to users, and a user input device, such as a keyboard or touch or writable screen, for receiving instructions as input, and/or a cursor control device, such as a mouse, trackball, or the like, for communicating user input information and command selections to the processor 634.

In another embodiment, the information output from the determination device 606 may be provided to a user device 608, such as a computer belonging to an enforcement authority. The user device 608 may include a computer at a dispatch center, a smart phone belonging to an enforcement driver in transit (and capable of making traffic stops), or to a vehicle computer and/or GPS system that is in communication with the determination device 606.

Example 1

The following example is provided for illustrative purposes and is not intended to be limiting. In the example, 195 images were used: 63 of which included a violation, and 132 of which did not include a violation. A portion of the images were used to train the classifier, and the remaining portion of the images were used for testing. During training, one or more Fisher Vector features were generated that corresponded to the region of interest 236. These features were input into a linear SVM classifier.

Table 1 below illustrates the performance of the proposed approach in terms of sensitivity, specificity, and accuracy. As used herein, "sensitivity" refers to a ratio of true positives (e.g., correctly identified as wearing a seat belt 240) to the total number of positive samples, "specificity" refers to a ratio of true negatives to the total number of negative samples, and "accuracy" refers to a ratio of the sum of true positive and true negatives to the total number of samples. Two different tests were run. In the first test, 30% of the images were used for training, and testing was conducted on the remaining 70% of the images. In the second test, 50% of the images were used for training, and testing was conducted on the remaining 50% of the images. As may be seen, sensitivity was slightly less in the second test; however, specificity and accuracy were improved in the second test.

TABLE 1

|  | Test 1: 30% training; 70% testing | Test 2: 50% training; 50% testing |
| --- | --- | --- |
| Sensitivity | 0.91 | 0.86 |
| Specificity | 0.74 | 0.84 |
| Accuracy | 0.75 | 0.85 |

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" may include any and all sub-ranges between (and including) the minimum value of zero and the maximum value of 10, that is, any and all sub-ranges having a minimum value of equal to or greater than zero and a maximum value of equal to or less than 10, e.g., 1 to 5.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A method for detecting a seat belt violation in a vehicle, comprising:
receiving an image of a front side of a vehicle;
detecting a windshield of the vehicle in the image;
cropping the windshield out of the image and discarding a remainder of the image;
locating a passenger through the windshield;
identifying a region of interest through the windshield that includes a portion of the passenger where a seat belt is visible if the seat belt is buckled, wherein the region of interest is defined relative to a plurality of landmark points that are at set positions with respect to the windshield of the vehicle, wherein a first of the landmark points is on a rear view mirror of the vehicle, wherein a second of the landmark points is at a bottom center of the windshield, and wherein a third of the landmark points is on a dashboard of the vehicle in front of a steering wheel;
extracting one or more first features from the region of interest of the image;
comparing the one or more first features to one or more second features extracted from a plurality of sample images, wherein the one or more second features are used to train a classifier; and
determining, using the classifier, whether the seat belt is buckled in the image based upon the comparison.

2. The method of claim 1, wherein the seat belt is buckled in at least one of the sample images, and the seat belt is unbuckled, and thus not visible, in at least one of the sample images.

3. The method of claim 1, further comprising locating a passenger in a front seat of the vehicle.

4. The method of claim 3, further comprising defining the region of interest relative to a location of the passenger.

5. The method of claim 1, further comprising detecting a windshield in the image.

6. The method of claim 5, wherein the one or more features are extracted from the region of interest in the image, and wherein the region of interest is smaller than the windshield.

7. The method of claim 1, wherein the one or more first features comprises a Fisher Vector, a bag-of-words, a histogram of oriented gradients, Harris Corners, local binary patterns, speeded-up robust features, scale-invariant feature transforms, or a combination thereof.

8. The method of claim 1, wherein a relationship between an area identifying a passenger's face and the region of interest is defined using the equations:

$$r_{ROI}(i) = r_{BB}(i) + R(i) \quad (1)$$

$$c_{ROI}(i) = c_{BB}(i) + C(i) \quad (2)$$

where r represents row indices of the image, c represents column indices of the image, i represents corners of a box in the image, R represents row offsets, C represents column offsets, BB represents the area identifying the passenger's face, and ROI represents the region of interest.

9. The method of claim 1, wherein the region of interest is at least partially defined relative to the landmark points using the equations:

$$r_{ROI}(i) = f_i(LM) \quad (1)$$

$$c_{ROI}(i) = g_i(LM) \quad (2)$$

where r represents row indices of the image, c represents column indices of the image, i represents corners of a box in the image, $f_i$ represents a function that outputs a linear combination of row indices of the landmark points, $g_i$ represents a function that outputs a linear combination of column indices of the landmark points, and LM represents the landmark points.

10. The method of claim 1, wherein extracting the one or more first features from the region of interest of the image comprises:
identifying a pixel from the region of interest of the image;
designating the pixel as a center pixel in a region;
determining an average value for the region, wherein the average value is between a predetermined minimum value and a predetermined maximum value; and
comparing each pixel in the region to the average value of the region.

11. The method of claim 10, further comprising:
assigning each pixel in the region a binary value based on the comparison;
generating an aggregate binary value for the region based upon the binary value assigned to each pixel in the region;
converting the aggregate binary value to a decimal number, wherein the decimal number is a descriptor of the center pixel; and
generating a feature vector using the decimal number for each of the pixels in the image.

12. The method of claim 1, wherein the one or more first features comprise Fisher Vector features corresponding to the region of interest, and further comprising inputting the Fisher Vector features into a linear support vector machine classifier.

13. A method for detecting a seat belt violation in a vehicle, comprising:
receiving a plurality of first images, each including a region of interest where a seat belt is visible if the seat belt is buckled, wherein the seat belt is buckled in at least one of the first images, and the seat belt is unbuckled, and thus not visible, in at least one of the first images;
extracting one or more first features from each of the first images;
training a classifier to determine whether the seat belt is buckled using the one or more first extracted features;
receiving a second image including the region of interest, wherein the region of interest in the second image is defined relative to a plurality of landmark points that are at set positions with respect to a windshield of the vehicle, wherein a first of the landmark points is on a rear view mirror of the vehicle, wherein a second of the landmark points is at a bottom center of the windshield, and wherein a third of the landmark points is on a dashboard of the vehicle in front of a steering wheel;
extracting one or more second features from the second image;
comparing the one or more second extracted features to the one or more first extracted features; and determining whether the seat belt is buckled in the second image based upon the comparison.

14. The method of claim 13, further comprising locating the windshield in the image, wherein the one or more second features are extracted from the region of interest in the second image, and wherein the region of interest is smaller than the windshield.

15. The method of claim 14, further comprising defining the region of interest relative to a location of a passenger's face visible through the windshield.

16. The method of claim 14, further comprising creating one or more global feature representations using the one or more second features.

17. The method of claim 14, wherein the classifier comprises a support vector machine, a decision tree, a neural network, or a combination thereof.

18. A system for detecting a seat belt violation in a vehicle, comprising:
a training device configured to:
receive a plurality of first images, each including a region of interest where a seat belt is visible if the seat belt is buckled;
extract one or more first features from each of the first images; and
determine whether the seat belt is buckled using the one or more first extracted features; and
a determination device configured to:
receive a second image including the region of interest, wherein the region of interest in the second image is defined relative to a plurality of landmark points that are at set positions with respect to a windshield of the vehicle, wherein a first of the landmark points is on a rear view mirror of the vehicle, wherein a second of the landmark points is at a bottom center of the windshield, and wherein a third of the landmark points is on a dashboard of the vehicle in front of a steering wheel;
extract one or more second features from the second image;
compare the one or more second extracted features to the one or more first extracted features; and
determine whether the seat belt is buckled in the second image based upon the comparison.

19. The system of claim 18, further comprising:
an image capture device configured to capture first images, the second image, or both; and
an illuminator connected to the image capture device.

20. The system of claim 18, wherein the seat belt is buckled in at least one of the first images, and the seat belt is unbuckled, and thus not visible, in at least one of the first images.

* * * * *